3,340,065
FODDERS OR FODDER CONCENTRATES
Hermann Eugen Prückner, Wesseling, Cologne, and Rudolf Ferdinand Maria Schanze, Berching, Upper Palatinate, Germany, assignors to Flachsroste Berching GmbH, Berching, Upper Palatinate, Germany, a firm
No Drawing. Filed Dec. 6, 1963, Ser. No. 328,477
Claims priority, application Germany, Dec. 8, 1962,
F 38,500
5 Claims. (Cl. 99—2)

ABSTRACT OF THE DISCLOSURE

New forms of animal foodstuffs are formed by utilizing bleaching earth containing raw fats obtained as industrial waste in the decoloring of fatty oils as a major component and mixing this with cellulosic fibers, e.g., save-all waste fibers or waste paper, to form free-flowing fodders of high fat contents.

---

The invention relates to the production of fodder, particularly mixed fodder and to concentrates used therefor with a high content of fat.

In the field of fodders for farm animals in particular, fat is of special importance as energy-giving foodstuff component, not the least on account of the influencial part this nutrient plays in the physiology of animal feeding. Thus some fat fractions, such as the mono-acids have an absolutely essential character, particularly short-chain fatty acids in promoting the production of milk, and quite generally fat has an accelerating and dietic irritation-reducing effect on metabolism. In every kind of tonic-foodstuff the fat enables the supply of high caloric values in the smallest possible volume.

Fat suitable for feeding purposes is present not only in the foodstuffs produced in the natural way. It frequently occurs as by- or waste-product in numerous industries, for example, quite generally in milling, in the manufacture of starch and the like. A deciding factor for the use of these fats is, apart from their suitability, also the cost which in the case of marketable fodders is determined per caloric unit of productive energy or as starch unit. The workability of the individual fat carriers is another important factor.

In this general field the invention has for its object to produce a fodder or a fodder concentrate which is just as rich in energy as it is easily digestible, which is easy to produce and which is reasonable in cost.

These advantages are attained according to the invention to a great extent quite generally by the use of mineral industrial wastes enriched with fat, such as, for example, bleaching earth from the manufacture of oil.

The bleaching earth, for example a mixture of Al and Mg silicates, is used in large quantities for decoloring dark, fatty oils and thereby becomes enriched to a comparatively great extent so that it leaves the filter press or similar plants with a content of raw fat amounting to about 40 to 50%.

As the fats occurring are generally highly digestible but on the other hand the bleaching earth component itself is tasteless and exerts and anti-laxative effect and furthers the intestinal flora, this fodder is very valuable for feeding animals.

For practical reasons, particularly on account of the high concentration of fat, but also on account of the fact that such mineral industrial wastes enriched in this manner are difficult to store in bunkers, it has been found advisable to mix these components rich in energy with cellulose, preferably α-cellulose, as carrier substance, as is done according to another feature of the invention.

The general idea is to use a carrier with the greatest possible volume and at the same time of lightest specific gravity so that caking of the individual fatty particles cannot occur and the fodder or concentrate remains free-flowing. The invention involves the use of polysaccharides, and particularly cellulose, as the carrier which has in itself nutritional value for the animal feed. The carrier substance for the fatty components is therefore not a ballast material but is itself an energy carrier.

The use of crude fibres from the manufacture of cellulose and paper as cellulose carrier substance meets these requirements particularly well, whereby the very fine fibrous stuff from the save-all occurring in the manufacture of high grade cellulose and paper products which is composed of very fine separate fibres and is therefore characterized by its exceptionally large surface area, is particularly useful.

In the usual nutrient analysis of foodstuffs, the "Weender Analysis," these fibre substances are for the most part designated as crude fibre content. It has, however, been found that these crude fibres are, in the case of ruminants and also in the case of pigs, converted by a bacterial process and rendered energetically useful and consequently do not appear as ballast. Therefore, cattle for example can utilize such crude fibres.

The invention covers the use of paper, cardboard and similar wastes as cellulose carrier material. In particular wastes of paper grades composed practically exclusively of α-cellulose, but also residues resulting from the manufacture of cardboard box blanks and possibly also the punchings from perforated card machines are excellently suitable as carrier substance for the mineral wastes enriched with fats. Experience has shown that these substances contain only small quantities of incrustations, if any at all.

It is particularly advantageous if, as provided by the invention, the carrier substance is finely ground and if necessary freed from incrustations. For pulverizing with the object of opening up the individual fibres, hammer mills and pin mills have proved particularly suitable, but other disintegrating devices also come into question.

According to a further development of the invention it is proposed that the bleaching earth or the like be dried and finely ground so that it is as far as possible free from water. In this state it is easy to mix with the cellulose carrier substance and a binding of these two components produces a free-flowing mixture with a content of crude fat amounting to about 45%.

Finally the invention also covers the mixing of other carriers and/or other nutrients (carbohydrates, protein, amides, fats, mineral substances, vitamins or the like) with the mineral substances enriched with fat and already mixed with the carrier substance. On the other hand, however, it is also possible to mix the mineral substances enriched with fat directly with a mixture composed of a carrier substance and at least one other nutrient or the like.

Owing to the physical characteristics both the finely disintegrated bleaching earth enriched with fat and also the crude fibres, alone or intermixed, are excellently suitable for the combination with other nutrient carriers of different kinds. Whereas, in the case of the known fodder mixtures, the most advantageous nutrient ratio can often not be produced because the volumetric capacity of the digestive tract of the animals is limited, the mixed fodder according to the invention does not involve these difficulties because the fatty component itself is only of small volume. Therefore when using this foodstuff the desired ratio can be produced within wide limits.

The economic advantages of the invention are primarily due to the fact that industrial waste products are used which are available in relatively large quantities and relatively cheap. Hitherto these initial products were considered merely as waste generally not suitable for further working. It was unexpectedly found that through the simultaneous use for bleaching earth enriched with fat and crude fibres from the manufacture and treatment of cellulose for feeding purposes in the case of useful farm animals, great advantages as regards energy combined with particularly effective properties from a physiological point of view were obtained.

If bleaching earth from the manufacture of oil is used for the production of fatty foodstuff components a percentage ratio of fat to mineral substance of 45:55% or even 50:50% is generally taken. This corresponds in the one case to a percentage by volume of 37.5:62.5 and in the other case to 40.8:59.2.

A combination of for example 93% fatty bleaching earth and 7% stuff from the save-all has about the following composition as concentrate:

Crude fat, 47% by weight=1150 starch units=4350 cal.
Cellulose, 7% by weight=65 starch units=250 cal.
Bleaching earth, 46% by weight.

1 kg. of this mixed fodder therefore contains 54% organic substance with 1215 starch units, which corresponds to 4600 calories.

Compared with other conventional foodstuffs the two-component mixture according to the invention is equivalent to 2.1 kg. wheat flour or 1.9 kg. forage maize (corn).

The excellent suitability of the mixed foodstuff according to the invention for the production of any desired nutritive combination is shown by the following example:

|  | Fat, percent | Protein, percent | Starch units |
|---|---|---|---|
| 20% Bleaching earth | 10 |  | 240 |
| 20% Molasses |  |  | 95 |
| 20% Soybean |  | 9 | 140 |
| 30% Stuff from the save-all |  |  | 165 |
| 10% Urea |  | 26 |  |
|  | 10 | 35 | 640 |

These nutritive constituents correspond to a dairy cattle feeding stuff IV, which with at least 32% protein represents the highest grade of dairy cattle fodder.

What we claim is:
1. An animal foodstuff comprising a free-flowing particulate mixture of bleaching earth having a content of 40 to 50% of raw fat obtained as an industrial waste in the decoloring of fatty oils with bleaching and crude cellulosic fibers from the manufacture of paper.
2. An animal foodstuff as claimed in claim 1 wherein said crude cellulosic fibers are save-all waste fibers.
3. An animal foodstuff as claimed in claim 1 wherein said crude cellulosic fibers are finely ground waste paper.
4. An animal foodstuff consisting essentially of 93% by weight bleaching earth containing 47% by weight of crude fat obtained as an industrial waste in the decoloring of fatty oils and 7% by weight of save-all waste fibers.
5. An animal foodstuff of the following composition in percentages by weight:
20% bleaching earth containing 10% fat obtained as an industrial waste in the decoloring of fatty oils,
20% molasses,
20% soybean,
30% save-all waste fibers,
10% urea.

References Cited
UNITED STATES PATENTS

| | | | |
|---|---|---|---|
| 2,715,067 | 8/1955 | Kamlet | 99—2 |
| 2,813,793 | 11/1957 | Drennan | 99—4 |
| 2,905,557 | 9/1959 | Degenhardt | 99—2 |
| 2,965,488 | 12/1960 | Belasco | 99—2 |
| 3,015,563 | 1/1962 | Rosenberg | 99—2 |
| 3,078,164 | 2/1963 | De Lisle | 99—2 |
| 3,155,521 | 11/1964 | Ward et al. | 99—2 |

OTHER REFERENCES

Andersen: Refining of Oils and Fats, pp. 138 and 142–3, Pergamon Press, The Macmillan Co., New York, N.Y. (1962).

A. LOUIS MONACELL, *Primary Examiner.*

HYMAN LORD, *Examiner.*

D. DONOVAN, J. M. HUNTER, *Assistant Examiners.*